July 16, 1940.   W. H. ROSS   2,208,473
SPEED CONTROL GOVERNOR FOR MOTOR VEHICLES
Filed March 9, 1939   2 Sheets-Sheet 1
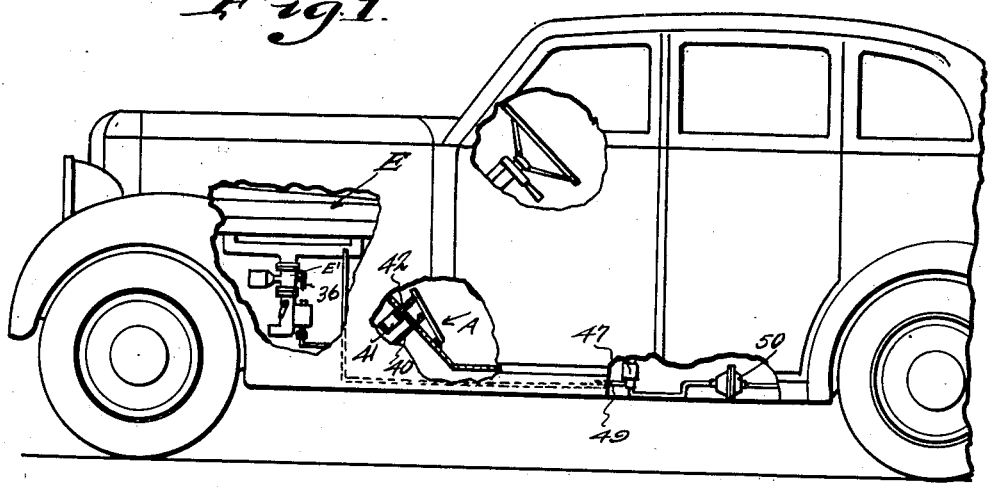
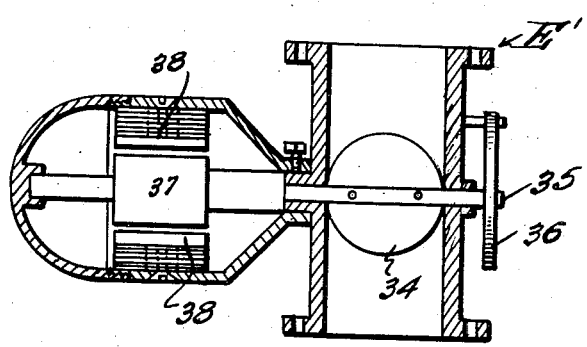
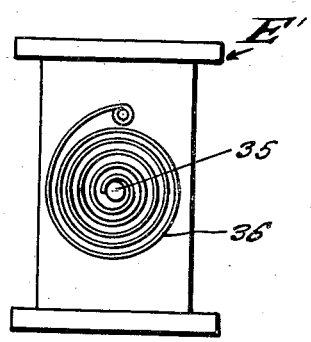
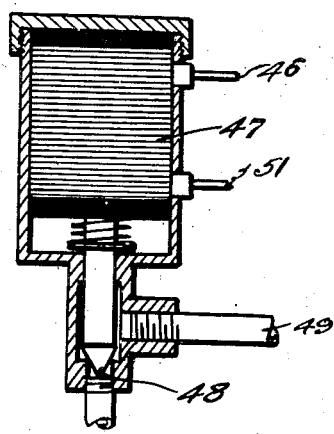
Inventor
W. H. Ross.
By L. B. James
Attorney Patented July 16, 1940

2,208,473

UNITED STATES PATENT OFFICE 2,208,473

SPEED CONTROL GOVERNOR FOR MOTOR VEHICLES

William H. Ross, Allentown, Pa.

Application March 9, 1939, Serial No. 260,873

9 Claims. (Cl. 192—3)

This invention relates to speed control governors for motor vehicles of the type employing internal combustion engines.

More particularly the invention relates to a governor for such purpose which, in operation, assures a constant speed for the vehicle and which can be controlled to eliminate governing action in times of emergency so that, in such an emergency, the speed of the vehicle may be increased to a sufficient extent to overcome the danger occurring through the emergency.

One important object of the invention is to provide a novel and improved device for the purpose set forth whereby the use of a pedal controlled accelerator is rendered unnecessary and the operator of the car is thereby freed from the constant muscular strain attendant on using such pedal controlled accelerator.

A second important object of the invention is to provide a novel and efficient device of this character which will eliminate the necessity of the car operator keeping constant watch on the car speedometer in order to keep from breaking speed laws.

A third important object of the invention is to provide a novel device of the kind which is so under control of the car operator that, with normal driving conditions he is assured of automatic speed control but when abnormal or emergency conditions arise he may instantly release the car from automatic control and operate the car as though it was improvided with any speed control device.

A fourth important object of the invention is to provide a novel device of this character wherein provision is made for automatic application of the vehicle brake when a predetermined speed is exceeded.

A fifth important object of the invention is to provide a device of this kind which will act as a regulator for the current derived from the usual generator.

Furthermore the use of the present invention saves gas, does not require the use of an accelerating pump in the carburetor; gives the device a controllable speed of any desired value within wide limits and permits shifting of the gears while the device is in operation.

With the above and other objects in view, as will be presently apparent, the invention consists in general of certain novel details of construction and combinations of parts hereinafter fully described, illustrated in the accompanying drawings and particularly pointed out in the claims.

In the accompanying drawings like characters of reference indicate like parts in the several views, and:

Figure 1 is a fragmentary side elevation, partly broken away, of an automobile equipped with this invention.

Figure 2 is a longitudinal section through the governing unit of the invention.

Figure 3 is an end view of the governing unit.

Figure 4 is a vertical section through the brake control valve used herewith.

Figure 5:
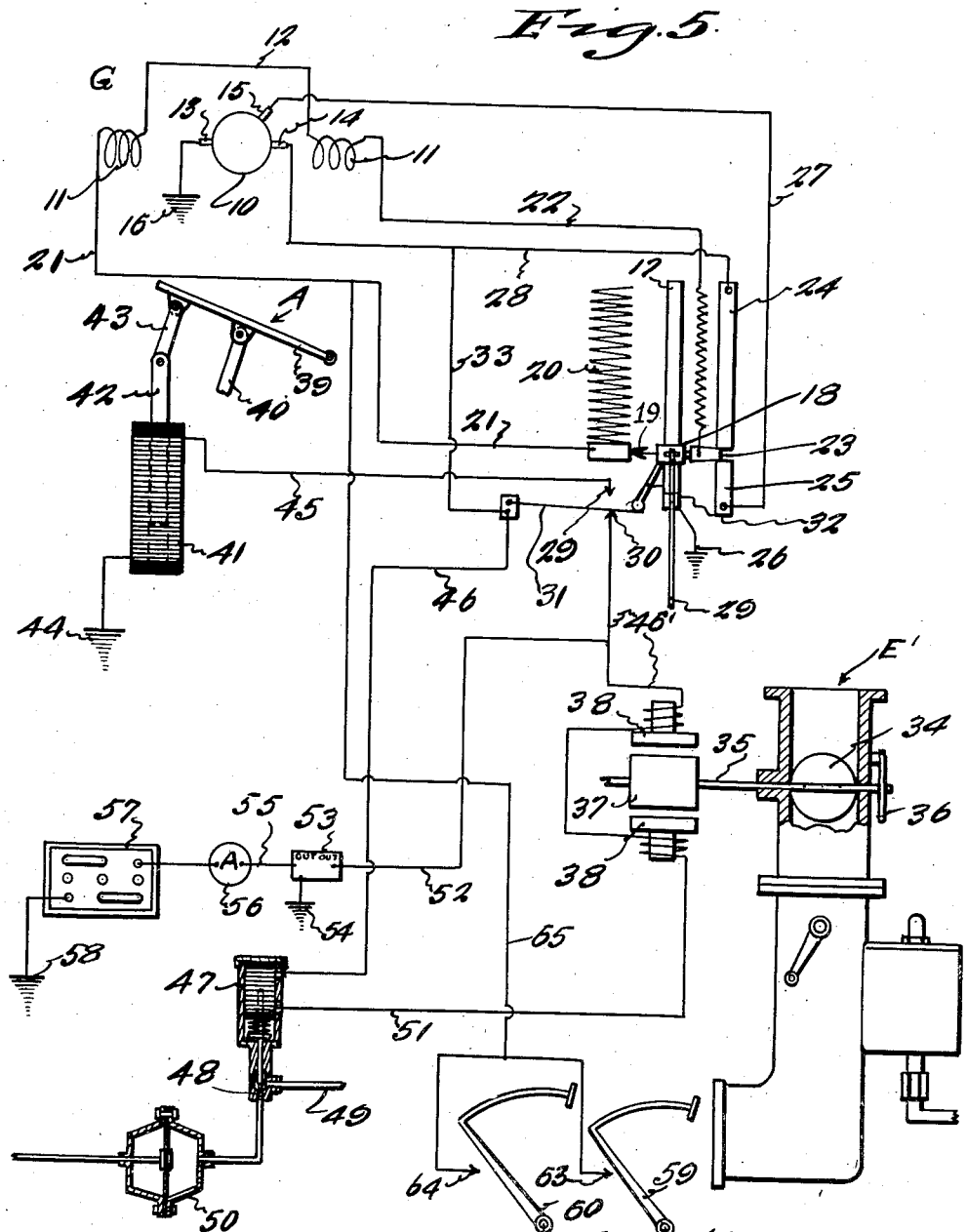
Figure 5 is a schematic diagram of the various parts of the invention and their connections.

The generator of the car is indicated generally at G and includes the armature 10 and the field coils 11 connected in series by the conductor 12. This generator is provided with a pair of brushes 13 and 14 and a third brush 15. The brush 13 is grounded as at 16. At 17 is a conductor guide bar whereon is mounted a slide 18 carrying a sliding contact 19 moving over a resistance coil 20 one end of which is connected by a conductor 21 in series with one coil 11. The other coil 11 is connected by a conductor 22 to a sliding contact 23 which is attached to the slide 18 to move therewith. Extending parallel to the guide 17 is a long contact strip 24 and a short contact strip 25 which are selectively engageable by the contact 23 as the slide 18 moves on the conductor guide 17. The guide 18 is grounded as at 26. A conductor 27 connects the brush 15 with the contact strip 25 and a conductor 28 connects the brush 14 with the contact strip 24. Control means 29 operable by the driver of the car serve to move the slide 18 on the guide 17.

With this feature of the construction the following is to be noted. If the slide 18 be moved upwardly from the portion shown in Figure 5 the brush 15 will be cut out of circuit so that the generator is converted from a third brush controlled generator to a plain shunt generator with its normal function of varying current delivery in direct ratio to the speed. Also such upward movement of the slide 18 carries the contact 19 over the resistance 20 which, as the upward movement occurs, introduces some portion of the resistance 20 into the field coil current and thereby weakens the shunt field.

Adjacent the lower end of the member 17 is a pair of opposed fixed contacts 29 and 30 between which is mounted a movable contact 31 so constructed as to be constantly urged into engagement with contact 29 but which is moved into engagement with contact 30 by an arm 32 fixed to and movable with the slide 18. A conductor 33 provides electrical connection between the conductor 28 and the contact 31.

The engine E is provided with the usual carburetor E' including a throttle valve 34 having a stem 35 and this valve is urged by a spiral spring 36 to fully open position. An armature 37, in the form of a permanent magnet, is fixed on the stem 35 to oscillate between series connected electro-magnets 38, the arrangement being such that energization of the magnets 38 tends to close the valve 34 against the action of spring 36, the extent of closing depending on the extent of magnetization of the magnets 38.

The foot accelerator is indicated in general at A and includes the usual pedal 39 and throttle connection 40, the latter being merely indicated since it is well known in the art. A solenoid coil 41 is provided with a core 42 which is connected by a link 43 with the pedal 39 so that energization of the coil depresses the pedal and thus causes, in the usual manner, acceleration of the engine. One terminal of the solenoid is grounded as at 44. The other terminal of the solenoid 41 is connected by a conductor 45 with the contact 29. The contact 30 is connected by a conductor 46' in series with the magnets 38. With this arrangement whenever the contact 31 is in engagement with the contact 29 current will flow from the generator 10 through brush 14, conductor 28, conductor 33, contact 31, contact 29, conductor 45, solenoid 41, ground 44, ground 16 and back to the generator through brush 13. This will place the pedal 39 under control of the solenoid 41 but, if the circuit be broken between contacts 31 and 29 the pedal will be released for operation by the driver of the vehicle.

A conductor 46 connected to the contact 31 connects conductor 46' with one terminal of a solenoid 47 which, when energized, opens a valve 48 controlling the supply of fluid under pressure from a pipe 49 to a brake actuating mechanism 50. The other terminal of this solenoid is connected by a conductor 51 in series with the magnets 38. From the conductor 46' there leads a conductor 52 which extends to a cut out 53 grounded at 54. A conductor 55 connects the cut out 53, through an ammeter 56 with a battery 57 grounded at 58.

Now, if contact 31 engages contact 29 current will flow, not only as before described, but also from generator 10 through brush 14, conductor 28, conductor 33, conductor 46, solenoid 47, conductor 51, magnet 38, conductor 46', conductor 52, cut out 53, conductor 55, battery 57, ground 58, ground 16 and brush 16 back to the generator. Thus, when the generator output, which is regulated by the position of contact 19, reaches a predetermined amperage (controlled by the generator speed) not only will the magnets 38 be energized but also the brake valve will be opened.

At 59 is the usual foot brake lever and at 60 is the usual clutch lever. These levers are shown as respectively grounded at 61 and 62. Contacts 63 and 64 are arranged in the path of these levers so that the levers will engage these contacts upon depression. The contacts 63 and 64 are connected in multiple by a conductor 65 to the conductor 21 so that depression of either of the levers 59 and 60 grounds the field of the generator G.

In operation let it be assumed that the car is being driven under normal conditions, and it is desired to bring the car to a constant speed of say 35 M. P. H.

A lever (not shown) on quadrant on top of steering wheel, and connected to member 29 is moved from off position to about center of space of its travel.

The foot accelerator on floor is pressed down hard and it will stay there, being held down by the solenoid 41.

The lever being moved does four things:

1. It breaks contacts between contacts 30 and 31 which have been short circuiting governor unit 37, 38 and solenoid 47, causing generator current to flow through windings and start to close butterfly in manifold. As soon as current has reached a pre-determined value, say 12 amperes, armature starts to turn closing butterfly valve, and slowing engine down.

2. Allows contacts 29 and 31 to close causing voltage to be applied to solenoid to hold down foot accelerator.

3. Causes sliding contact 23 to move from 3rd brush contact 25 to main brush contact 24 causing generator to no longer be a 3rd brush controlled generator but a straight shunt generator, which charges more as it speeds up, and less as it slows down; thereby being responsive to speed variations, and thereby causing the governor to be responsive to changes in current.

4. Causes sliding contact 19 to be moved along resistance coil 20 which weakens shunt field of generator, and so as the resistance of the field is changed, the speed of the generator must necessarily change to adapt the charging rate to control the speed of the motor.

Now the car will be controlled by the generator current, and as the car comes to a hill, the motor will slow down a bit, which will cause the generator to drop the charging rate a small amount, which will cause governor to be weakened and so the spring on governor shaft will cause the butterfly valve 34 to open a small amount, and thus car will be brought to a higher speed till it equalizes itself again.

As the car comes to an incline, and speeds up, generator 10 charges more and thus more current goes through governor, which strengthens the pull of the same, which closes the valve 34 to a certain extent, causing the gas inlet to motor to be closed but nothing has been done to prevent the car from running away on a hard incline. However, brake solenoid valve 48 starts to function, as the current from the generator rises, causing the solenoid valve to open partly and allow the vacuum from the motor manifold (which at this time is high, because valve 34 is closed, and motor is turning rapidly, causing a strong vacuum) to enter the brake operating means 50, causing brakes to be gradually applied until car slows down enough to cause generator to charge less, and brake solenoid valve to close, releasing brake.

If one meets heavy traffic and desires to run normally (i. e. run with regular foot accelerator again) the lever on quadrant is moved to off position, which 1. Cuts out accelerator holding solenoid, which allows foot accelerator to return to normal position again.

2. Short circuits out governor unit and brake solenoid valve, causing them to be inoperative.

3. Shifts field connection of generator from main brush to third brush causing it to operate as a 3rd brush generator again.

4. Restores sliding contact to bottom of resistance coil, thereby taking resistance out of the shunt field circuit.

While driving with the device in operation, if for any reason the clutch or brake would be depressed, at high speed, motor could be kept from racing, by the clutch and brake contacts, short circuiting out the sliding resistance, which would cause the generator to charge more, and thereby close the governor, causing the engine to run at a desired M. P. H. rate.

There has thus been provided a simple and efficient device of the kind described and for the purpose specified.

It is obvious that changes may be made in the form and construction of the invention without departing from the material principles thereof. It is not, therefore, desired to confine the invention to the exact form herein shown and described but it is desired to include all such as come within the scope claimed.

What is claimed is:

1. In a speed regulator for motor vehicles, a generator having a shunt field and having a pair of main brushes and a third brush, a throttle valve, spring urged to open position, electro-magnetic means associated with the throttle valve for moving the same in closing direction against said spring, circuit connections between the generator and the said electromagnetic means and including a single pole two point switch movable into one position to establish a circuit through said electro-magnetic means and into another position to short circuit said electromagnetic means, and manually controllable means for actuating said switch.

2. In a speed regulator for motor vehicles, a generator having a shunt field and having a pair of main brushes and a third brush, a throttle valve, spring urged to open position, electro-magnetic means associated with the throttle valve for moving the same in closing direction against said spring, circuit connections between the generator and the said electro-magnetic means and including a single pole two point switch movable into one position to establish a circuit through said electro-magnetic means and into another position to short circuit said electro-magnetic means, manually controllable means for actuating said switch, and accelerator means including a solenoid energized upon the switch being in the first position.

3. In a speed regulator for motor vehicles, a generator having a shunt field and having a pair of main brushes and a third brush, a throttle valve, spring urged to open position, electro-magnetic means associated with the throttle valve for moving the same in closing direction against said spring, circuit connections between the generator and said electro-magnetic means and including a single pole two point switch movable into one position to establish a circuit through said electro-magnetic means and into another position to short circuit said electro-magnetic means, manually controllabe means for actuating said switch, a brake controlling valve, and a solenoid in series with said electro-magnetic means and acting when energized to open said valve.

4. In a speed regulator for motor vehicles, a generator having a shunt field and having a pair of main brushes and a third brush, a throttle valve, spring urged to open position, electro-magnetic means associated with the throttle valve for moving the same in closing direction against said spring, circuit connections between the generator and the said electro-magnetic means and including a single pole two point switch movable into one position to establish a circuit through said electro-magnetic means and into another position to short circuit said electro-magnetic means, manually controllable means for actuating said switch, accelerator means including a solenoid energized upon the switch being in the first position, a brake controlling valve, and a solenoid in series with said electro-magnetic means and acting when energized to open said valve.

5. In a speed regulator for motor vehicles, a generator having a shunt field and having a pair of main brushes and a third brush, a throttle valve spring urged to open position, electro-magnetic means associated with the throttle valve for moving the same in closing direction against said spring, circuit connections between the generator and the said electro-magnetic means and including a single pole two point switch movable into one position to establish a circuit through said electro-magnetic means and into another position to short circuit said electro-magnetic means, manually controllable means for actuating said switch, and means actuated by the movement of the manually controlled means and operating to control the resistance through the field of the generator.

6. In a speed regulator for motor vehicles, a generator having a shunt field and having a pair of main brushes and a third brush, a throttle valve spring urged to open position, electro-magnetic means associated with the throttle valve for moving the same in closing direction against said spring, circuit connections between the generator and the said electro-magnetic means and including a single pole two point switch movable into one position to establish a circuit through said electro-magnetic means and into another position to short circuit said electro-magnetic means, manually controllable means for actuating said switch, accelerator means including a solenoid energized upon the switch being in the first position, and means actuated by the movement of the manually controlled means and operating to control the resistance through the field of the generator.

7. In a speed regulator for motor vehicles, a generator having a shunt field and having a pair of main brushes and a third brush, a throttle valve spring urged to open position, electro-magnetic means associated with the throttle valve for moving the same in closing direction against said spring, circuit connections between the generator and the said electro-magnetic means and including a single pole two point switch movable into one position to establish a circuit through said electro-magnetic means and into another position to short circuit said electro-magnetic means, manually controllable means for actuating said switch, a brake controlling valve, a solenoid in series with said electro-magnetic means and acting when energized to open said valve, and means actuated by the movement of the manually controlled means and operating to control the resistance through the field of the generator.

8. In a speed regulator for motor vehicles, a generator having a shunt field and having a pair of main brushes and a third brush, a throttle valve spring urged to open position, electro-magnetic means associated with the throttle valve for moving the same in closing direction against said spring, circuit connections between the generator and the said electro-magnetic means and including a single pole two point switch movable into one position to establish a circuit through said electro-magnetic means and into another position to short circuit said electro-magnetic means, manually controllable means for actuating said switch, accelerator means including a solenoid energized upon the switch being in the first position, a brake controlling valve, a solenoid in series with said electro-magnetic means and acting when energized to open said valve, means actuated by the movement of the manually controlled means and operating to control the resistance through the field of the generator.

9. In a speed regulator for motor vehicles, a generator having a shunt field and having a pair of main brushes and a third brush, a throttle valve spring urged to open position, electro-magnetic means associated with the throttle valve for moving the same in closing direction against said spring, circuit connections between the generator and the said electro-magnetic means and including a single pole two point switch movable into one position to establish a circuit through said electro-magnetic means and into another position to short circuit said electro-magnetic means, manually controllable means for actuating said switch, and means actuated by movement of said manually controlled means and opening and closing the circuit of the third brush of the generator.

WILLIAM H. ROSS.